(12) United States Patent
Duffy

(10) Patent No.: US 7,258,717 B2
(45) Date of Patent: Aug. 21, 2007

(54) FILTER CROSS BRACE

(75) Inventor: Dean R. Duffy, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 381 days.

(21) Appl. No.: 10/878,781

(22) Filed: Jun. 28, 2004

(65) Prior Publication Data

US 2005/0284116 A1    Dec. 29, 2005

(51) Int. Cl.
*B01D 46/52* (2006.01)
*B01D 39/00* (2006.01)
*B01D 46/40* (2006.01)
*B01D 46/00* (2006.01)

(52) U.S. Cl. .................... 55/497; 55/499; 55/501; 55/502; 55/511; 55/521; 55/524; 55/498; 55/DIG. 31; 95/273

(58) Field of Classification Search .............. 55/497, 55/499, 501, 502, DIG. 31
See application file for complete search history.

(56) References Cited

U.S. PATENT DOCUMENTS

| | | | |
|---|---|---|---|
| 1,832,281 A | 11/1931 | Davies | |
| 2,032,262 A | 2/1936 | Cori | |
| 2,058,669 A | 10/1936 | Dollinger | |
| 3,296,781 A | 1/1967 | Schumann | |
| 3,513,643 A | 5/1970 | Tarala | |
| 3,869,392 A | 3/1975 | Wolf | |
| 4,135,900 A * | 1/1979 | Westlin et al. | 55/499 |
| 4,386,948 A | 6/1983 | Choksi et al. | |
| 4,692,177 A | 9/1987 | Wright et al. | |
| 4,963,171 A | 10/1990 | Osendorf | |
| 5,188,646 A | 2/1993 | Nolen, Jr. | |
| 5,599,446 A | 2/1997 | Junker et al. | |
| 5,792,229 A * | 8/1998 | Sassa et al. | 55/497 |
| 5,902,361 A | 5/1999 | Pomplun et al. | |
| 6,045,598 A | 4/2000 | Fath et al. | |
| 6,348,084 B1 | 2/2002 | Gieseke et al. | |
| 6,406,509 B1 * | 6/2002 | Duffy | 55/492 |
| 6,521,011 B1 | 2/2003 | Sundet et al. | |
| 6,709,480 B2 | 3/2004 | Sundet et al. | |
| 2002/0108359 A1 | 8/2002 | Powell | |

FOREIGN PATENT DOCUMENTS

| | | |
|---|---|---|
| DE | 197 46 804 A1 | 4/1998 |
| FR | 2 398 531 | 2/1979 |
| JP | 7-299317 | 11/1995 |
| WO | WO94/11089 | 5/1994 |
| WO | WO96/29138 | 9/1996 |
| WO | WO98/20961 | 5/1998 |

* cited by examiner

*Primary Examiner*—Duane Smith
*Assistant Examiner*—Ives Wu
(74) *Attorney, Agent, or Firm*—Kathleen B. Gross; William J. Bond

(57) ABSTRACT

The invention is related to a framed filter media comprising a pleated filter media having a fluid inlet face and a fluid outlet face with peripheral sidewalls. The peripheral sidewalls of the pleated filter are attached to the frame generally by an adhesive. The frame is preferably a flexible strip frame formed into three or more (up to an infinite number if the sidewall sections(s) is formed into a circular filter frame) sidewall sections each having a substantially flat sidewall and at least two projecting filter retaining tabs which form a flange on a first face of the sidewall section for containing the filter along its peripheral sidewalls and any adhesive. A cross brace is also inserted within the filter retaining tabs which fits into at least one pleat of the framed pleated filter media. The cross brace fits into the space formed by the pleated filter media but is not in continuous contact with the filter media forming the pleat. The cross brace can be flexible and has end keys or projections for insertion into the filter frame flanges and attachment to the sidewall sections and/or the flange. In a particular embodiment, the cross brace has a continuous non-linear profile with an internal profiled groove with a mating surface, for insertion and locking of removable end keys or other items, such as handles and labels, which removable items have a profile that mates with, or locks the mating surface of the profiled groove.

45 Claims, 9 Drawing Sheets

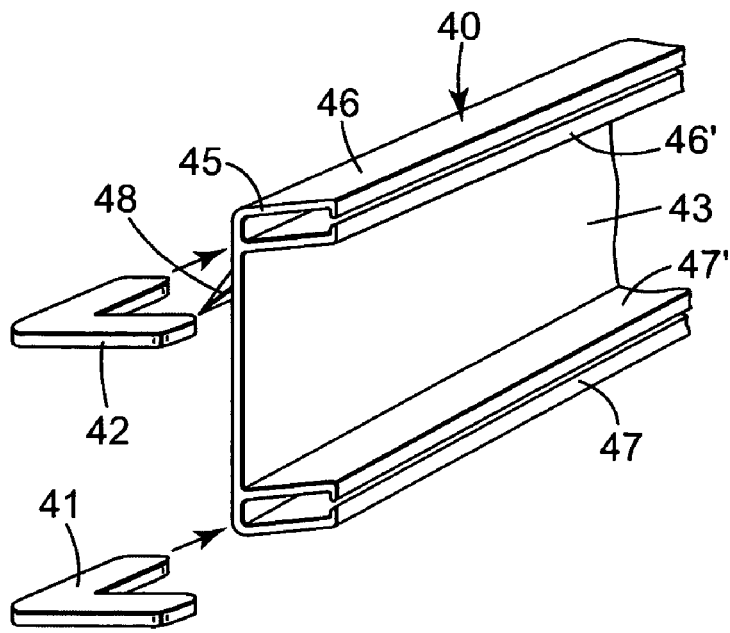
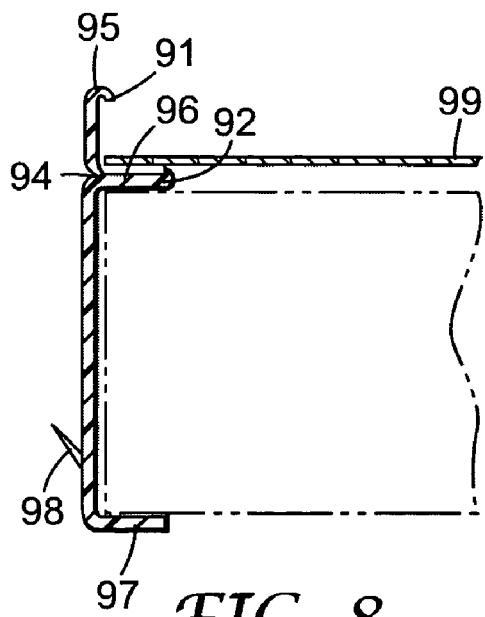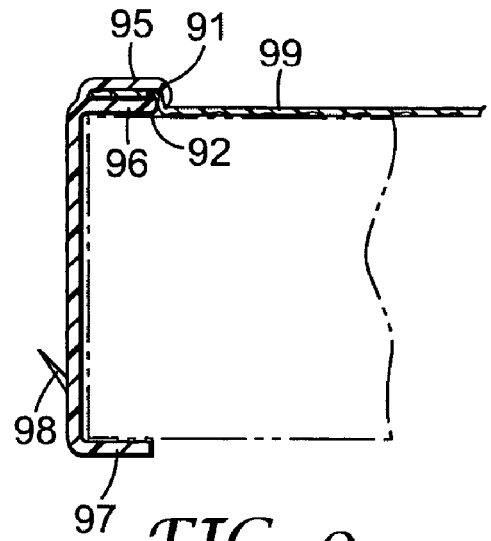

FILTER CROSS BRACE

BACKGROUND OF THE INVENTION

This invention is directed at a unitary framed filter where the filters form is capable of being formed by a continuous extrusion process.

Conventionally three dimensional filter frames are formed by injection molding or similar type processes. In its simplest variation, the frame is directly formed as a unitary structure. A simple technique for this is described in U.S. Pat. No. 2,032,262 where a pleated filter is held in a jig with only the edge portions extending out of the jig. This jig is then inserted into a mold form and a plastic type material is injected, embedding the exposed pleat edges in the space between the jig and the mold form. Similarly, U.S. Pat. No. 5,792,229 shows an elastomeric filter frame formed directly on a pleated filter media by injection molding a foaming resin into the pleats of the pleated filter along the periphery of the pleated filter in one embodiment of the invention described. This filter requires a separate rigid frame in which the filter is fit into the frame by a friction type fit. A preformed molded frame is described in U.S. Pat. No. 3,296,781. The filter media is subsequently attached to the molded frame by use of an adhesive or the like.

Three-dimensional filter frames can also be formed from multiple pieces, which are then assembled by use of adhesive, welding, friction fit, snap fits, mechanical fasteners or the like. This type of approach permits more flexibility in terms of frame forms and functionality than unitary filter frames, however, it generally results in framed filters which are complicated to manufacture. For example, U.S. Pat. No. 4,692,177 describes a two-piece snap fit filter frame where both of the two pieces are three-dimensional injection molded frame pieces. Fluid bypass is prevented in this particular arrangement by placing a bead of adhesive into a groove in one of the frame pieces and subsequently forcing a top edge of the pleated filter into the adhesive bead during the snap fit assembly process. This type of framed filter would be very difficult to implement in an automated production process due to the strategic placement of the adhesive within an enclosed space and the need for rapid assembly of three three-dimension pieces coming together simultaneously with very close tolerances. A similar approach is described in U.S. Pat. No. 1,832,281, however, the filter media in this embodiment is friction gripped along the periphery of the filter media by mating flanges of the two frame elements, one of which comprises an exhaust flue. U.S. Pat. No. 2,058,669 describes a three-dimensional filter frame formed by cutting out the face portions of two corrugated boxes halves, which halves are subsequently cemented together with a pleated filter and comb-like pleat stabilizing elements. A similar approach is also discussed in U.S. Pat. No. 3,513,643 where the rectangular frame is described as a conventional multi-piece aluminum frame with the frame elements welded together and the filter adhesively attached to the frame. U.S. Pat. No. 4,386,948 describes a filter for use in a respiratory device where the filter frame is a three-piece molded structure where the individual filter frame pieces and filter media are all formed of polypropylene and welded together. The filter media is held between two flanges of two injection molded polypropylene pieces with ultrasonic fusing of the three elements forming a fluid tight seal. U.S. Pat. No. 5,599,446 describes an injection molded filter frame provided with a peripheral groove on one face which accepts an injection molded elastic piece which snap fits into the groove. The elastic piece is suitably attached, generally by injection molding, to the periphery of a flat filter medium. This approach generally is only suitable for use in holding a flat filter media taut along the peripheral edge of the rigid frame similar to a window screen. WO 96/29138 describes an injection molded filter frame piece which grips the edge of a filter medium by two snap fit side pieces which move toward each other and snap into a central rigid structural element. The snap fit pieces have projections that come together and hold the edges of the filter medium. Corner snap fit, frame pieces are separately provided to hold the filter media and frame to a rectangular form. The object of this invention was to provide a simple and cost effective method of manufacturing a filter frame, which can be recycled if need be. Generally, with all the above designs, the filter frame is created by forming individual frame elements that are three-dimensional in form. These three-dimensional frame elements must be directly attached to the filter media during formation of the frame or require further assembly that requires bringing together multiple three-dimensional elements.

Other patents have proposed forming a filter frame from a die cut flat material which is subsequently formed into a filter frame by folding the frame elements together into the final three-dimensional filter frame shape. For example, Japanese Publ. Patent Appln. 7-299317 describes a steel-type frame blank into which notches are cut to allow for tabs to be folded inward creating u-shaped channels. The notches allow the frame to be folded into a rectangular frame shape and subsequently welded together. Additional filter elements such as wire retaining elements can be provided on the opposite faces of the filter media. A much more complex shape is described in WO 94/11089 where the frame blank is described as punched from any suitable sheet material such as cardboard. Two separate sheets are cut which are mirror images of each other. Each sheet is symmetrical having three sections. One section is designed to hold and maintain the pleat form along a side of the pleated filter. The second section is designed to snap fit so as to hold the terminal end of the pleated filter. The third section engages the other sheet at a corner. The two folded sheets are then brought together with the two halves held together by slats and corresponding slits of the third section. A peripheral compressible sealing material is then provided along the external portion of the assembled frame to allow the frame to be friction fit into a housing. Although this frame allows a filter to be formed from a sheet of flat material, the complex three-dimensional folding along three separate axis makes this an inherently complicated assembly to manufacture in a continuous process not to mention the need for subsequent adhesive application of a sealing strip.

The present invention is directed at trying to provide a simple and convenient way to reinforce a framed pleated filter media.

BRIEF SUMMARY OF THE INVENTION

The invention is related to a framed filter media comprising a pleated filter media having a fluid inlet face and a fluid outlet face with peripheral sidewalls. The peripheral sidewalls of the pleated filter are attached to the frame generally by an adhesive. The frame is preferably a flexible strip frame formed into three or more (up to an infinite number if the sidewall sections(s) is formed into a circular filter frame) sidewall sections each having a substantially flat sidewall and at least two projecting filter retaining tabs which form a flange on a first face of the sidewall section for containing the filter along its peripheral sidewalls and any adhesive. A cross brace fits into at least one pleat of the framed pleated filter media and is inserted into the pleats such that it is retained by the filter retaining tabs. The cross brace fits into the space formed by the pleated filter media but is not in continuous contact with the filter media forming the pleat. The cross brace can be flexible and has end keys or projections for insertion into the area of the filter frame flanges and attachment to the sidewall sections and/or the flange. In a particular embodiment, the cross brace has a continuous non-linear profile with an internal profiled groove having a mating surface, for insertion and locking of removable end keys or other items, such as handles and labels, which removable items have a profile that mates with, or locks with, a mating surface of the profiled groove.

The invention is further related to a method of framing a filter media comprising the steps of, not necessarily in order: (a) providing a strip frame blank comprising at least a substantially flat sidewall and at least two projecting filter retaining tabs forming a continuous flange on a first face of the continuous strip frame blank; (b) notching the filter retaining tabs to form corner notches which corner notches extend at least to the substantially flat sidewalls creating sidewall section between the corner notches and optionally scoring first and/or second faces of the sidewall portions to form living hinges; (c) cutting the continuous strip frame blank into discrete strip frame blanks; (d) applying an adhesive compound into the channels on the first face of the strip frame blanks; (e) attaching a pleated filter media to at least one sidewall section first face having the adhesive compound; (f) wrapping the remaining sidewall sections around the pleated filter media wherein the sidewall sections lengths generally correspond to pleated filter media sidewall lengths; (g) imbedding the filter media sidewalls into the adhesive compound in the sidewall section channels; and (h) setting an adhesive compound to form a framed filter wherein the sidewall sections meet to form a seam such that the sidewall sections completely circumscribe the filter media peripheral sidewalls, wherein a cross brace is placed into a pleated filter during or prior to step (e) following formation of the framed filter by insertion into a formed pleat of a pleated filter.

BRIEF DESCRIPTION OF THE DRAWINGS

FIG. 7 is a cutaway perspective view of an alternative embodiment of a corner seam of a filter frame.

FIGS. 8 and 9 are a cutaway side views of an alternative embodiment of the invention including a prefilter.

DETAILED DESCRIPTION OF THE PREFERRED EMBODIMENTS

The framed filter media comprises a pleated filter media having a fluid inlet face and a fluid outlet face with peripheral sidewalls attached to a flexible frame formed into three or more (up to an infinite number if the sidewall sections(s) is formed into a circular filter frame) sidewall sections. The sidewall sections generally have a substantially flat sidewall and at least one projecting filter retaining tab, preferably two, which form a flange on a first face of the sidewall section for containing the filter sidewalls and any adhesive. The flange, or one or both tabs, also contains a cross brace which fits into at least one pleat of the framed pleated filter media. The cross brace fits into the space formed by the pleated filter media but generally is not in continuous contact with the filter media forming the pleat. The cross brace can be flexible to allow it to bend for insertion into the pleat but is rigid under compression. The cross brace has end keys for insertion onto the filter frame sidewall sections and generally within the flanges. In a particular embodiment, the cross brace has a continuous profile with an internal groove with a mating surface for insertion of removable end keys or other items, such as handles or labels which removable items have a profile that mates with a mating surface of the profiled groove.

The invention is further related to a method of framing a filter media comprising the steps of, not necessarily in order and not necessarily including all the steps: (a) providing a strip frame blank comprising at least a substantially flat sidewall and at least two projecting filter retaining tabs forming a continuous flange on a first face of the continuous strip frame blank; (b) notching the filter retaining tabs to form corner notches which corner notches extend at least to the substantially flat sidewalls creating sidewall section between the corner notches and optionally scoring first and/or second faces of the sidewall portions to form living hinges; (c) cutting the continuous strip frame blank into discrete strip frame blanks; (d) applying an adhesive compound into the channels on the first face of the strip frame blanks; (e) attaching a pleated filter media to at least one sidewall section first face having the adhesive compound; (f) wrapping the remaining sidewall sections around the pleated filter media wherein the sidewall sections lengths generally correspond to pleated filter media sidewall lengths; (g) imbedding the filter media sidewalls into the adhesive compound in the sidewall section channels; and (h) setting an adhesive compound to form a framed filter wherein the sidewall sections meet to form a seam such that the sidewall sections completely circumscribe the filter media peripheral sidewalls, wherein a cross brace is placed into a pleated filter during or prior to step (e) following formation of the framed filter by insertion into a formed pleat of a pleated filter.

Figure 1:
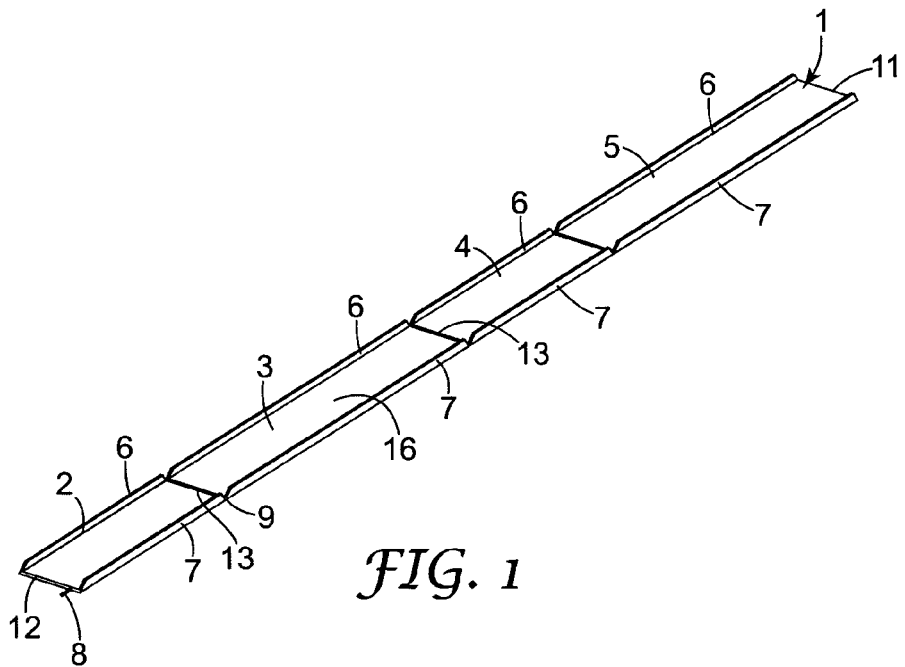
FIG. 1 is a perspective view of a discrete strip frame blank used to form a filter frame used in the invention.

The invention framed pleated filter and method of framing a pleated filter media can use an integral strip frame blank 1 as shown in FIG. 1 which is an elongated element divided into opposing sidewall sections by post-extrusion notching and/or scoring. The strip frame blank as shown is extruded but can also be a chipboard material, sheet metal or other deformable or flexible shape retaining materials. In the embodiment shown in FIG. 1, the two elongate opposing sidewall sections 2 and 4 form the end walls of the finished filter frame 10 as shown in FIG. 2. The elongate opposing sidewall sections 3 and 5 form the longitudinal sidewalls of the finished filter frame 10. The strip frame blank 1 further includes filter retaining tabs 6 and 7. These filter retaining tabs form a flange and serve to contain the adhesive compound used to attach the filter material to the sidewalls and also helps to contain the pleated filter material to prevent movement in and out of the plane of the finished filter frame. The filter retaining tabs also act as reinforcing beams to stiffen the filter frame structure. The filter retaining tabs generally are formed of the same thermoplastic material forming the sidewall sections with the filter retaining tabs generally being from 4 to 8 mm in height. Further, provided in the embodiment shown in FIG. 1 is an integral extruded or coextruded sealing lip 8 which can be formed of the same or different thermoplastic material forming the sidewall sections 2-5. The sealing lip 8 is an elastically deformable thin ridge-like element where the elasticity generally is provided by deformation resistance of the sealing lip thermoplastic material. This property of elastic deformation is generally provided by a plastically or elastically deformable material, for example, polyolefins such as; polypropylenes, polyethylenes, ethylene/propylene, ethylenepropylenediene copolymers, blends, and the like; polyesters; nylons; ABS copolymers; styrene/diene block copolymers, polyvinylchlorides; etc. The filter frame blank sidewall sections are generally formed of thermoplastic polymers that are relatively rigid, which may also be polymers exhibiting elastic deformation resistance. Suitable polymers for forming the sidewall sections include; polyolefins such as; polypropylenes, polyethylenes, ethylene/propylene copolymers, blends, and the like; polyesters; nylons; ABS copolymers; polyvinylchlorides; etc. These polymers can also include particulate additives for added rigidity such as talc, glass fibers, or the like at levels generally less than 30 percent by weight.

Generally the strip frame blank 1 is cut from a substantially continuous extruded strip frame material with the cut portions forming ends 11 and 12. The cut strips frame blank 1 is then either subsequently, during or prior to cutting, provided with corner notches 9 on the filter retaining tabs. To allow the strip frame blanks to be folded into a rectangular form without pushing each other out of a common plane, the corner notches are preferably about 90° cutouts. If other filter forms are desired, more and/or different notch dimensions or angles can be provided. For example, hexagonal or like filter frame forms could be created. Also cut notches of less than 90° can be provided if the terminal ends of the retaining tabs defining the notches are allowed to overlap. Generally, the notch angles are equal to or less than the angle that the sidewall sections form when they meet. In any event, the notches should extend across the full width of the tabs 6 and 7 to the flat portion 16 of the sidewall sections 2, 4, 3, and 5. This is to allow the sidewall sections to easily bend or fold freely at the notched section. A further notch or cut 19 is provided on the opposite face cutting into the sealing lip 8 opposite the notched corner section 9 when provided. This cut 19 is generally a straight cut, removing a minimal amount of the sealing lip material, or score. Preferably, the notched sections of the strip frame blank are also provided with score lines 13 to form living hinges that facilitate folding of the strip frame blank sidewall sections into the final filter frame forms. These score lines 13 can easily be created by a hot wire, transverse cutting with rotary cutting blades, plunge cutting with a blade knife, or the like. The distance between the notched sections of the strip frame blank define a sidewall section and generally correspond to the length of the filter media sides which engage that sidewall section. However the two terminal sidewall sections may together engage a single filter media side, in which case the individual terminal sidewall sections may be shorter than the filter media side, which it engages. Generally, however, the filter media sides are 2 to 3 mm shorter than the distance between the notched sections to allow for the adhesive compound.

Figure 2A:
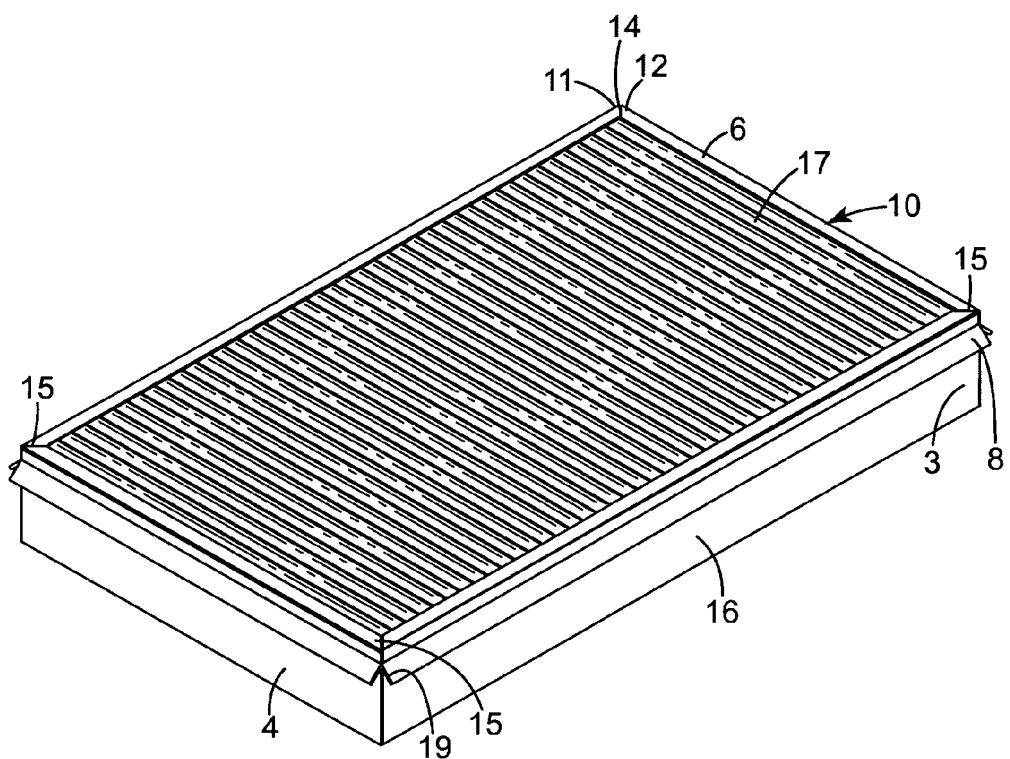
FIG. 2a is a perspective view of an assembled filter using the strip frame blank filter of FIG. 1 and a pleated filter media.

A finished framed filter formed from the FIG. 1 blank is shown in FIG. 2a where a pleated filter media material 17 having an upstream and downstream face is contained within the assembled strip frame blank 1. The sealing lip 8 projects radially outward from the frame to provide sealing engagement with a filter holding frame (not shown). The 90° corner notches 9 create continuous corner details 15 by butting engagement of the filter retaining tabs 6 and 7 on the sidewalls section. The pleated filter media 17 is maintained within the folded filter frame blank in sealing engagement with the sidewall sections by provision of a suitable adhesive compound. The adhesive compound 18 also sealing engages the two strip frame blank ends 11 and 12 on two terminal sidewall sections to form a corner seam 14. The assembled filter 10 is a rigid rectangular filter form where the pleated filter media 17 is in sealing engagement with the four sidewall sections by the adhesive compound 18, which adhesive compound 18 and attached filter media 17 also provides added rigidity to the assembled filter 10. Sealing between the framed filter 10 and any filter housing (not shown) is provided by the sealing lip 8 which provides a substantially continuous edge seal along the outer periphery of the filter frame 10. The sealing lip also provides for frictional engagement with the surrounding filter housing.

Figure 2B:
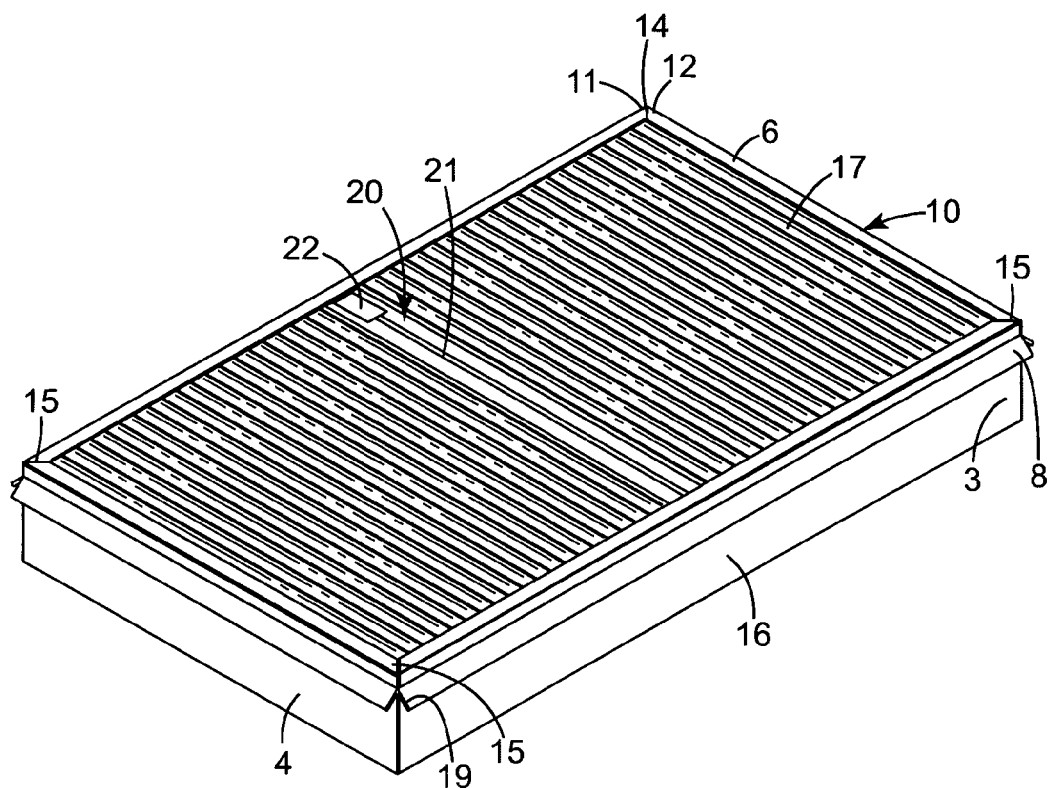
FIG. 2b is a perspective view of an assembled filter of the present invention using the strip frame blank filter of FIG. 1, a pleated filter media and the invention cross brace.

The cross brace 20, shown in FIG. 2b, is used with a filter frame, to allow additional support for large area pleated filters. Generally, cross braces are used with frames having a large cross-sectional area. The sidewall sections of the filter frame are generally formed of a thermoplastic material, sheet metal and/or chipboard, although other materials can be employed. Flexibility means only that the frame can deform or deflect by some degree when placed under a high deflection force by an incoming airflow. Preferably, the filter frame 10 is a thermoplastic material, with the cross brace 20 formed with the same thermoplastic material as the frame 10 to allow for readily disposability and continuous manufacturing, as well as facilitating the use of compatible adhesives which will readily bond the cross braces to the filter frame sidewalls. The invention cross braces are designed to be inserted into an already pleated filter media between at least one pleat on one or both sides of the pleated filter medium. The cross braces are also retained on the sidewalls of the filter frame 10 within the same flange which retains the filter media generally using the same or different adhesives that retain the filter media, if adhesives are used for attachment. The cross brace has a key element which engages with the sidewall and optionally the top and/or bottom tabs forming the flange of the filter frame.

These keys 22 can be integrally formed with the cross brace or a portion of the cross brace or the keys can be removable or insertable elements. The key 22 could be insertable or attachable to an optional mating element on the cross brace. The mating element could be a mating surface such as mating grove 21. The mating surface allows the key to slide, which allows for adjustability of the cross brace length. As shown in FIGS. 2b and 4b, the cross brace can be a continuously extruded profiled (having a nonplanar cross-section) thermoplastic material provided with a groove into which is inserted a suitably sized mating key. A continuously extruded brace groove allows for the insertion of suitably sized keys as well as other additional items such as handles or labels or the like. The groove can additionally hold adhesives or reinforcement compounds which can be inserted at anytime to further rigidify the brace. The use of a one or two removable keys can also allow adjustability of the brace length to account for frame size variation. The keys can be of any suitable height such that they engage the sidewall and optionally one or both flange tabs. The groove and the key, and other elements insertable into the groove, have mating profiles to allow the key or other elements to lock into place in the groove. The cross brace groove can have a male-type ridge that can be used to engage with a female-type groove or the like on a mating element or vise versa.

Figure 11A:
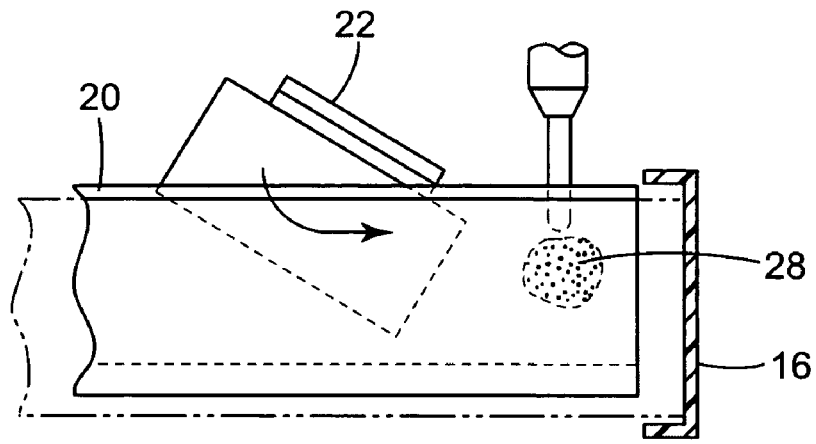
FIGS. 11a-11c are cutaway side views of the FIG. 10 embodiments showing a key being inserted with the adhesive
Figure 11B:
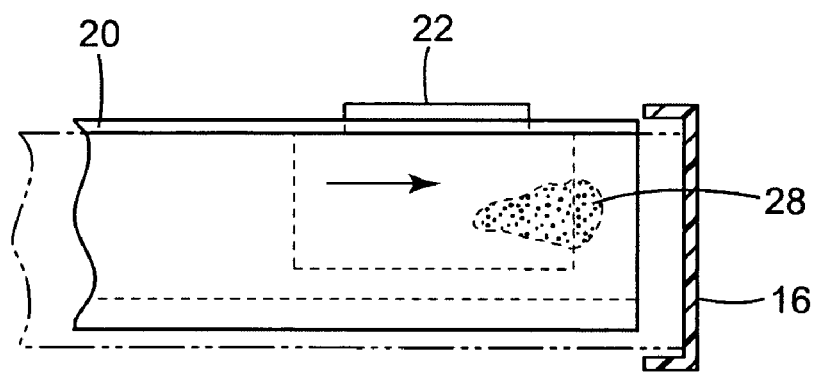
Figure 11C:
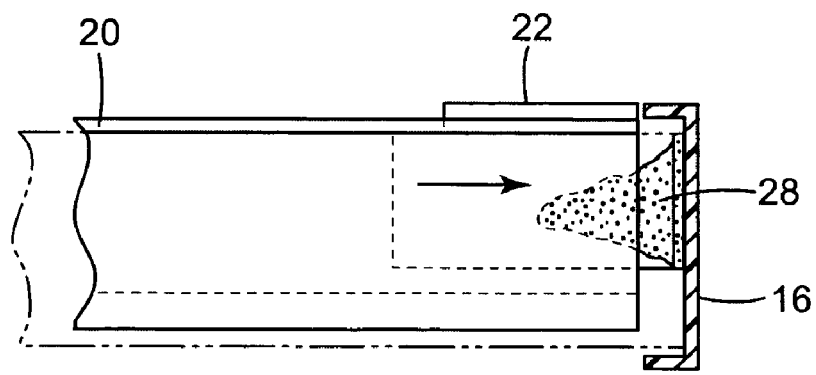

Adhesive used to optionally attach the cross brace to the sidewall section can be applied during the manufacture of the frame in a continuous framing operation or applied subsequently by conventional methods. A removable key 22 which is inserted into a groove 21 can also be inserted simultaneously with adhesive 28 to form a bond with the cross brace and also with the filter side frame. The key 22 can slide along the groove 21 to provide for secure attachment and adjustability to allow the cross brace to accommodate manufacturing tolerances or variation and various frame dimensions while pressing adhesive 28 into the sidewall 16 to form a secure attachment. The adhesive 28 also is smeared along the groove 21 securely bonding the removable key 22 to the groove 21 as shown in FIGS. 11a-11c.

The invention cross braces can also be formed by an injection molding process or the like where the keys are integrally formed into or on the cross braces. In this case the cross brace is generally inserted into the pleated filter medium prior to the pleated filters being inserted into the frame by the method described, however flexible fixed (without adjustable keys) cross braces might be insertable following framing of the pleated filters by flexing the cross braces out of plane and inserting within a pleat area 29. In all cases, the cross brace is a separate element securely spanning the filter frame at the two ends of the cross brace, generally secured with adhesive. The cross brace generally is not coextensive with the pleat of the pleated filter media into which it is inserted. By this it is meant that the cross brace has one or more elements that project out of the plane of the filter media 17 into the internal pleat area 29 and/or the cross brace body 24 is only in intermittent contact with the pleated filter media 17 forming the pleat in the internal pleat area 29.

Figure 3:
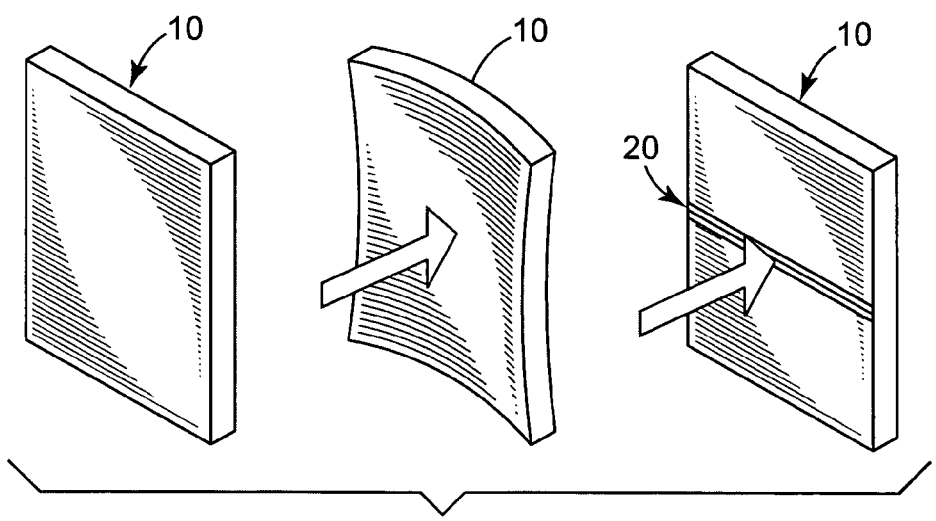
FIG. 3 is a perspective series showing a framed filter with and without a cross brace.

As shown in FIG. 3 without a cross brace 20 a large format filter formed of a flexible framed filter material will tend to bow inward with the pressure of incoming air.

Figure 4A:
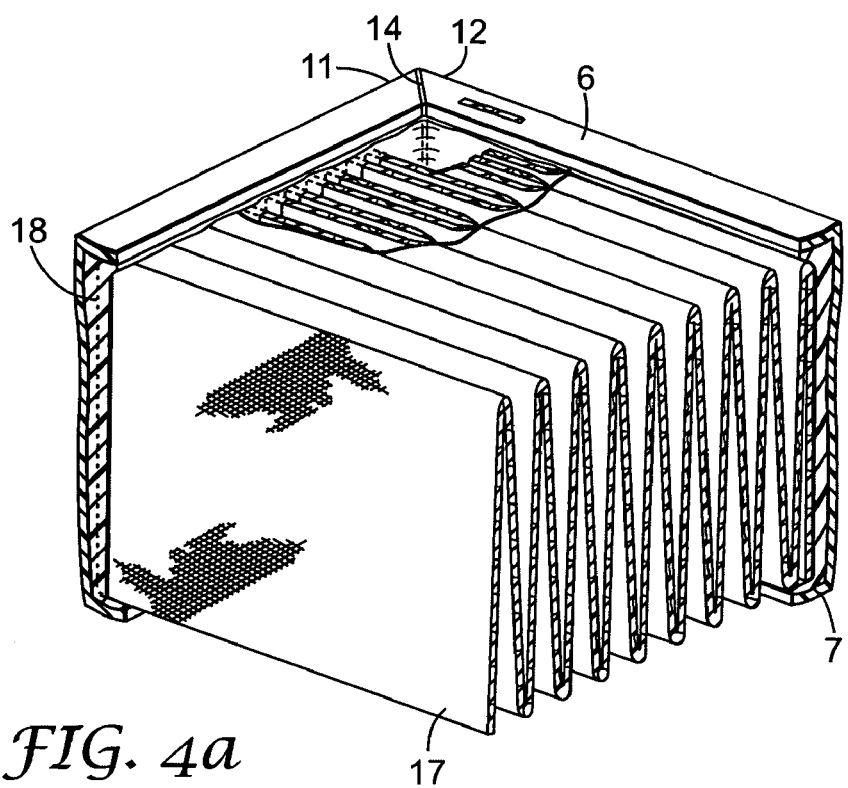
FIGS. 4a and 4b are cutaway perspective views of a corner portion of the filter frame of FIGS. 2a and 2b respectively.
Figure 4B:
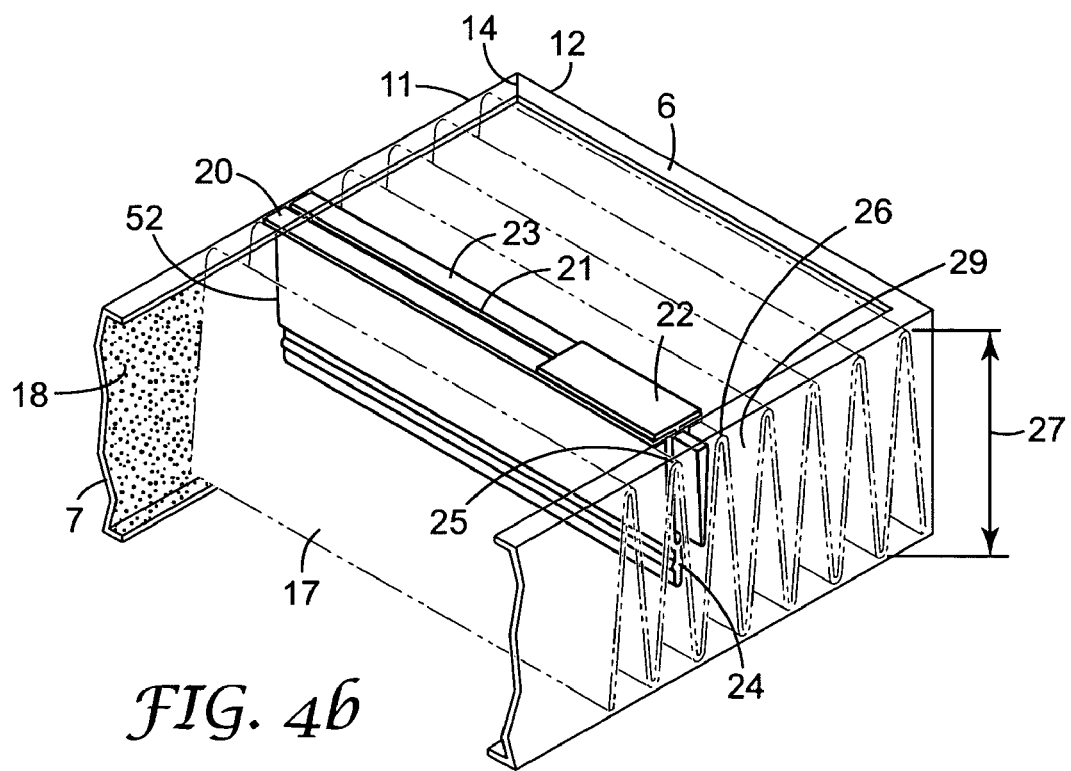

FIG. 4a shows a cutaway perspective view of the end butt seam 14 created, for example, in the first embodiment shown in FIGS. 1 and 2. The two abutting ends 11 and 12 of the strip frame blank are held in position by the adhesive compound in the flange created by the strip frame blank flat sidewall sections walls 16 and the filter retaining tabs 6 and 7. The pleated filter media 17 is retained in the strip frame blank by an adhesive material 18, which adhesive also creates the corner seam 14 holding together the two end portions of the strip frame blank and the filter retaining tabs 6 and 7.

Figure 10:
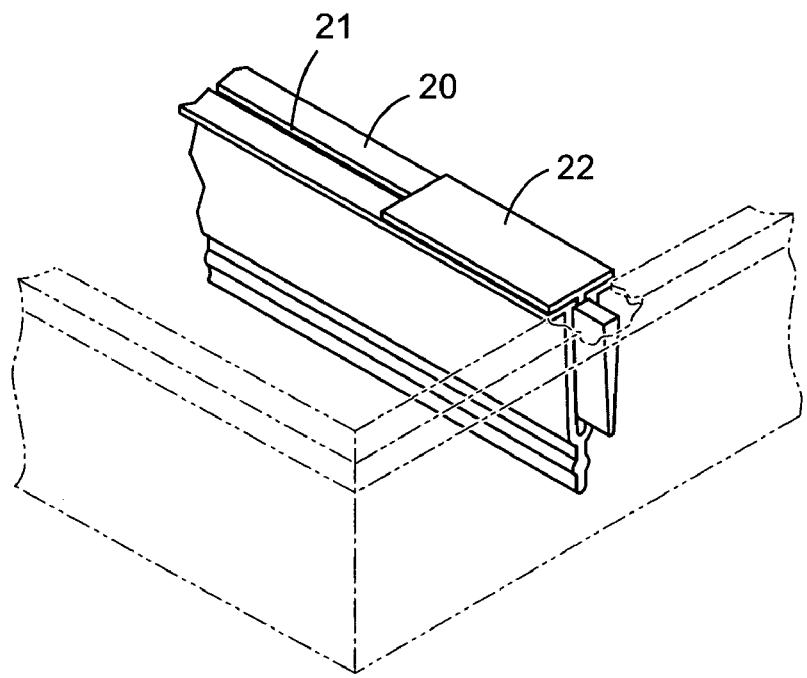
FIG. 10 is a cutaway perspective view of the FIG. 4b embodiment.

FIGS. 4b and 10 show the same cutaway perspective view as FIG. 4a but with a cross brace 20. The cross brace 20 is a continuous extruded-type with a groove 21 into which is inserted a removable key 22. The removable key 22 and opposite end 52 of the cross brace engages with the upper tab 6 and the adhesive 18. The cross brace 20 has lips 23 that extend generally continuously (but could be intermittent) on both sides of the brace 20 for added rigidity. However a lip 23 could be only used on one side of the cross brace 20. The lips 23 are also used to engage with at least adjacent pleat tips 25 and 26 to allow for additional support of the filter media, however, this is optional. The body 24 of the cross brace 20 has a profile that allows it to be inserted between two pleats into an internal pleat area 29 without substantial deformation of the pleat structure. In other words, the cross brace body 24 does not press against the filter media 17. In this embodiment this is accomplished by the cross brace body tapering at a sharper angle than the filter media pleat along some portion of the cross brace body. The cross brace body can extend from 30 to 100 percent of the pleat depth 27 or 50 to 90 percent.

Figure 5A:
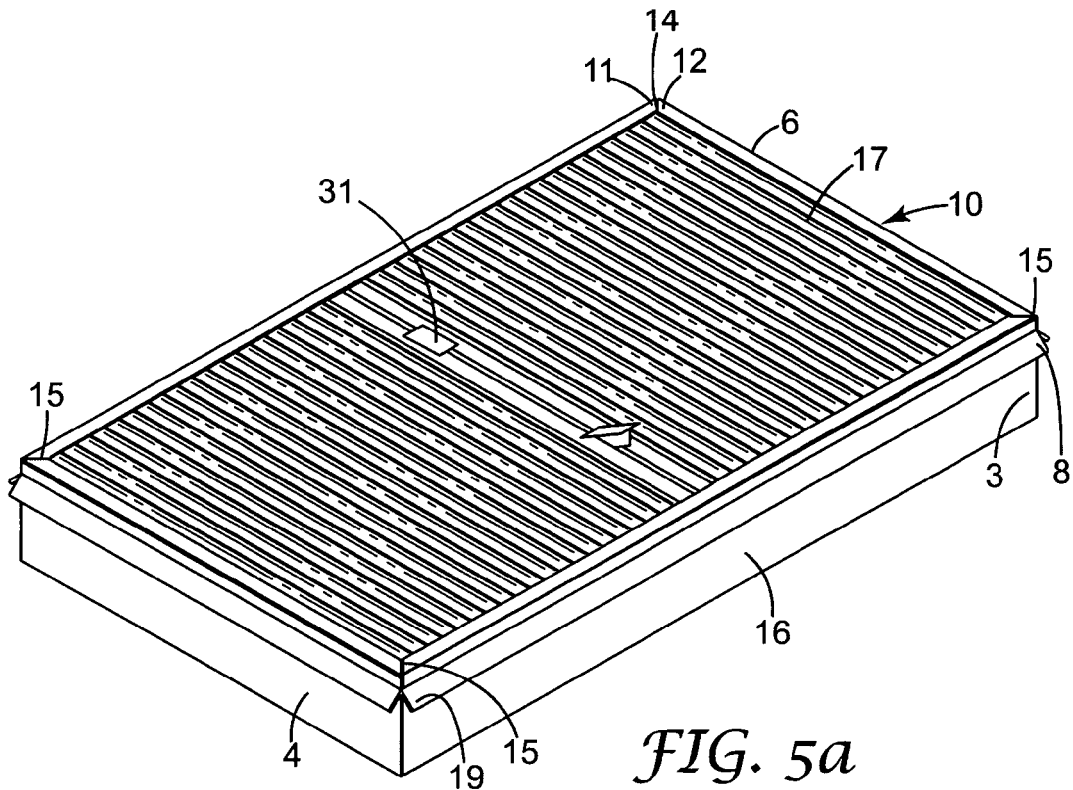
FIGS. 5a and 5b are perspective views of the first embodiment filter frame of the invention with removable labels and handles, respectively.
Figure 5B:
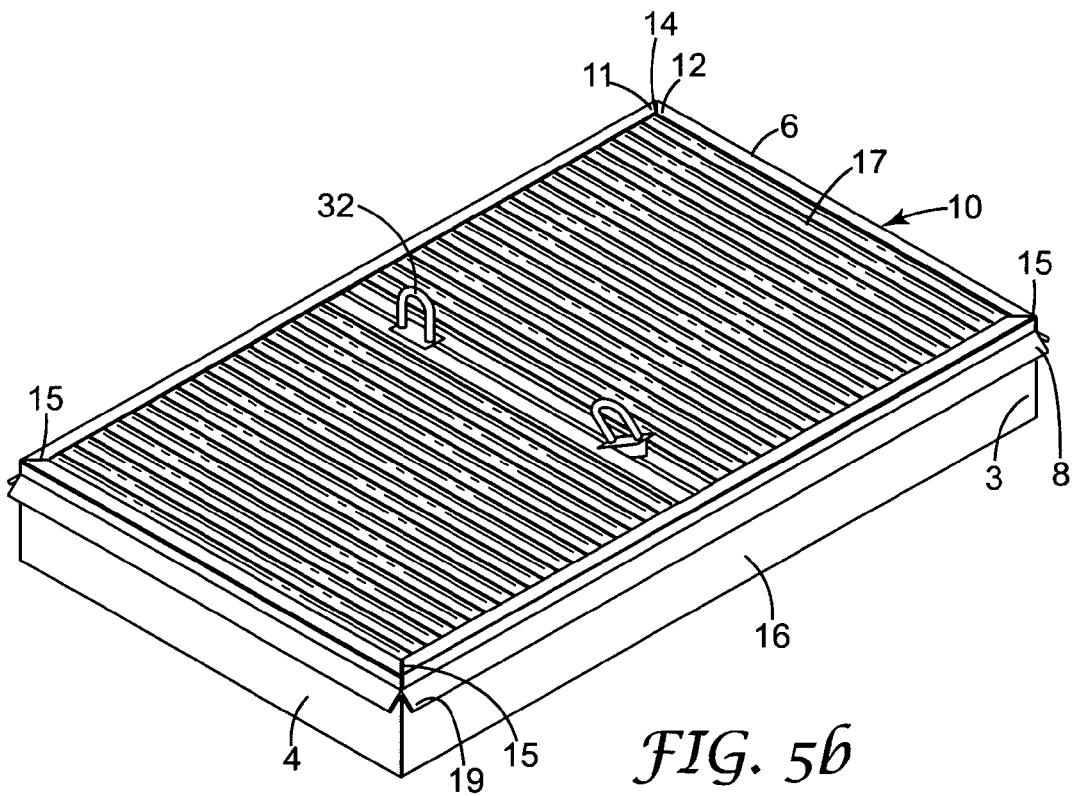

FIGS. 5a and 5b show the FIGS. 2b or 4b embodiment with labels 31 or handles 32 respectively being inserted into the cross brace 20 groove 21.

The embodiment of FIG. 7 is similar to the FIG. 2 embodiment except that the filter retaining tabs 46' and 47' include secondary tabs 46 and 47 designed to create a double walled channel. The sealing lip 48 is provided on sidewall 43. The channel can be open, as shown in FIG. 7, or closed as desired. The channels can be used to accommodate keys 41 and 42 to interlock abutting ends 45 of the strip frame blank 40. The keys 41 and 42 can be used alone or with adhesive or other suitable bonding mechanisms. This structure has additional rigidity due to the double walled filter retaining tabs and more secure abutting filter frame seams when the keys are used.

The embodiment of FIGS. 8 and 9 is similar to the FIG. 2 embodiment except that the sealing lip 98 is upturned and a filter retaining tab 96 has been modified to engage a secondary movable retaining tab 95 that pivots about a living hinge 94. Filter retaining tab 97 is as in the FIG. 2 embodiment. The movable tab 95 has lip structure 91 that engages a corresponding lip structure 92 on the filter retaining tab 96 in a snap fit engagement. The mating tabs 95 and 96 can be used to hold a prefilter 99 or like element.

Figure 6:
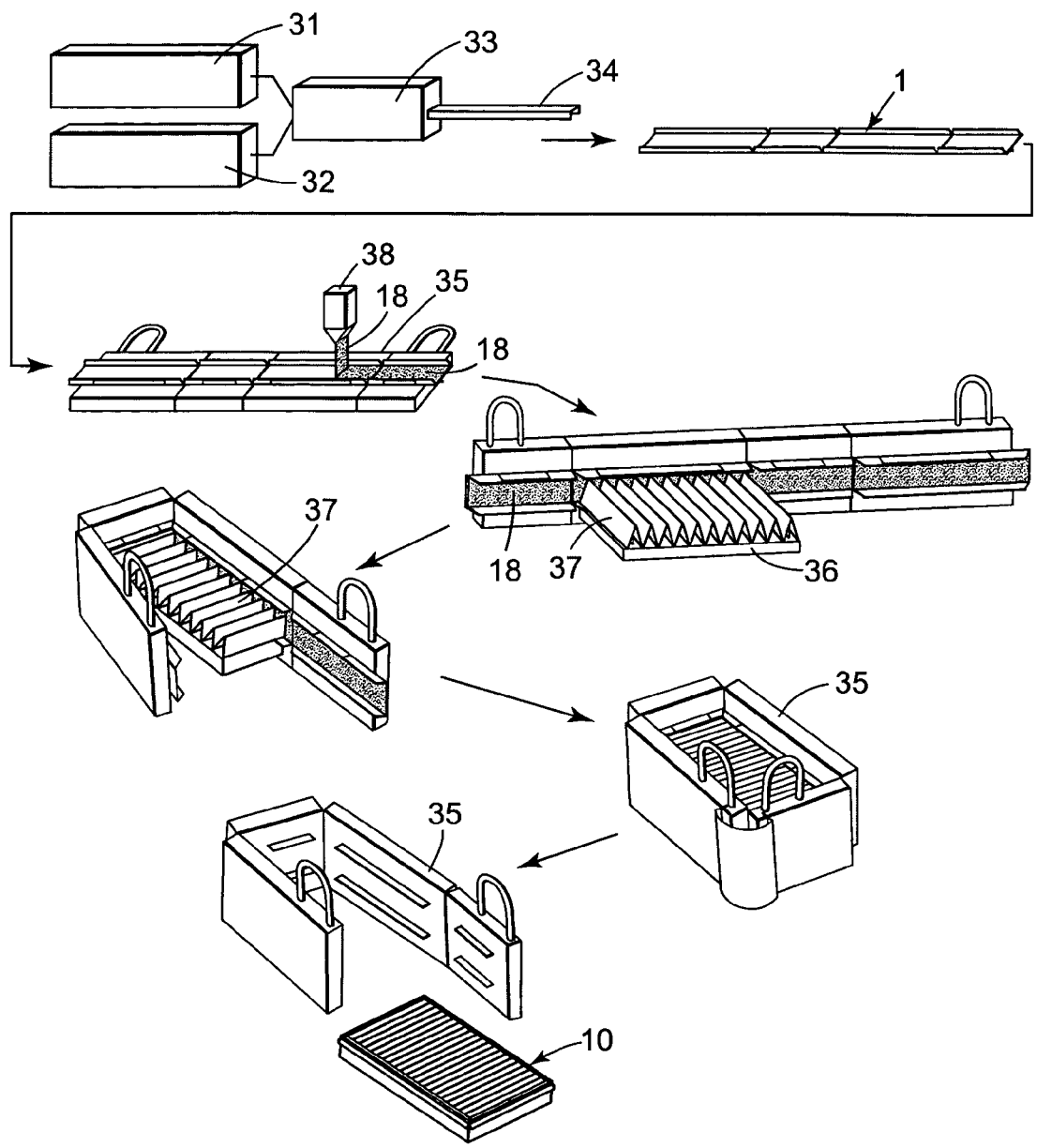
FIG. 6 is a schematic view of the invention process for framing a filter, as shown in FIG. 2b.

A method of assembling a strip frame blank 10, such as shown in FIG. 1, into an assembled filter frame is shown in FIG. 6 with respect to a pleated filter element. A pair of extruders 31 and 32, containing the same or different polymers, is used to feed molten polymer into a feedblock and die 33. A single extruder could also be used where a single polymer is used to form the strip frame blank. Alternatively, a three layer die (e.g., a Cleoron™ type die), or more, could be used with a splitter used to feed one polymer flowstream into two portions of the die, or alternatively a third block extruder could be used. Generally, the strip frame sidewall sections 2, 3, 4 and 5, including the filter retaining tabs 6 and 7, and the flat sidewall section walls 16 are formed of the same polymer. The filter sealing lip 8 can be formed of the same or a different polymer than the sidewall sections depending on the sealing lip requirements and the polymer selected for the sidewall sections. The profile extruded blank 34 is then cut into discrete filter frame blanks 1 which are simultaneously, concurrently or subsequently notched and optionally scored such as by transverse cutting with a rotary knife blade. The formed notched and scored filter frame blanks 1 are then placed in a framing jig 35 or the like. The framing jig 35 has friction retaining strips placed on the framing jig which allow folding of the framing jig around the base fixture 36 to provide forming registration for the filter assembly. The channels are filled with an adhesive compound 18 by, for example, spray deposition, a hot melt applicator 38, or the like. The adhesive compound provides a generally fluid tight seal and can have a depth or from 0.25 to 4.0 mm, preferably 0.5 to 2.0 mm. The adhesive compound could also be provided prior to placement of the frame into the jig if desired. With the preferred hot melt type adhesive compound the hot adhesive also helps the filter frame blank bend when formed around a filter in a framing jig or the like. A preformed filter media positioned on base fixture 36 is then placed on the adhesive compound on one sidewall section, preferably a sidewall section not intended to form a side seam. The filter media should inherently have sufficient rigidity to resist compression by the adhesive compound or be reinforced as needed. This reinforcement could only be in one direction, for example with a pleated filter, or both, for example with a non-rigid flat filter. The filter frame in the framing jig is then wrapped around the base fixture 36 and filter media 37 pushing the ends of the filter media into the adhesive compound in the remaining sidewall sections and concurrently achieving final dimensional registration for the filter assembly through engagement with base fixture 36. The adhesive compound at this point has a viscosity low enough to allow for the filter media to easily penetrate into the adhesive compound yet does not sag and flow out of the strip frame channel. The framing jig is then permitted to remain closed for a time sufficient to allow the adhesive compound to set, at which time the formed filter 10 is released from the jig.

Figure 12:
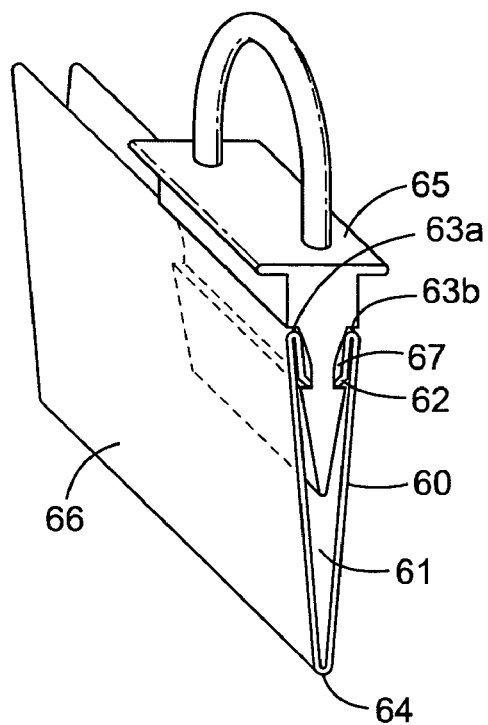
FIG. 12 is a perspective view of a second embodiment cross brace of the invention.

FIG. 12 shows an alternative embodiment cross brace according to the invention formable from a flat preform material 66. The preform material 66 is folded along fold lines 64 to form the groove 61. Secondary folds 63a and 63b are provided to form a male engagement lip 62 within the groove 61. This male engagement lip 62 can engage a suitably provided female engagement groove 67 on an inserted element 65, which in this case is shown as a handle. The folds 64, 63a and 63b can be maintained by ductile type material, such as metals. However with ductile materials or other nonductile or like materials, such as plastics or paperboard, the folds could be maintained more securely with adhesive beads or the like dispensed along the fold lines 64, 63a or 63b.

Figure 13:
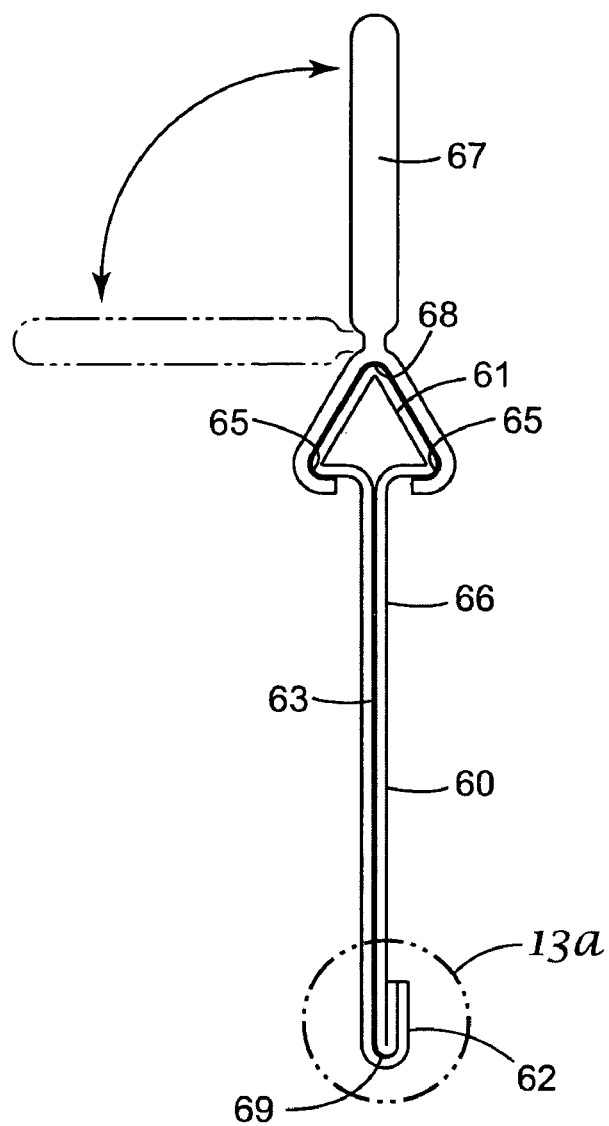
FIGS. 13 and 13a are side views of a third embodiment cross brace of the invention.
Figure 13A:
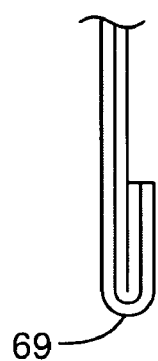

FIG. 13 shows an alternative embodiment of a cross brace 60 according to the invention where a male projection 61 is used as the mating element instead of a groove. Onto this projection 61 could be attached removable keys, labels 67 or handles as in the previous embodiments. The male element 61 in this embodiment provides rigidity as well as forming an attachment surface. As shown in FIG. 13, the cross brace is formed by a flat sheet preform material 66 as in the FIG. 12 embodiment. Adhesive could be used in the fold areas 65, 68 or 69 to keep the material shape as well as in the cross brace body area 63. In FIG. 13, the end 69 could be additional folded as shown in FIG. 13a to provide for added rigidity.

Figure 14:
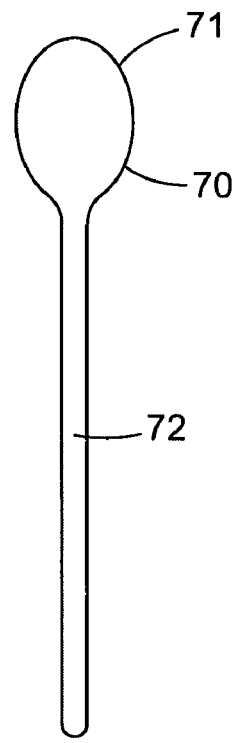
FIG. 14 is a side view of a fourth embodiment cross brace of the invention.

Alternatively, shapes like that shown in FIG. 13 could be a solid extruded or molded profiles as shown in FIG. 14. The male element 71 on body 72 in the FIG. 14 embodiment is a type that may not firmly engage with an attachable element, but could be provided solely for added rigidity or to redirect or streamline airflow.

I claim:

1. A framed pleated filter media comprising a pleated filter media having a fluid inlet face and a fluid outlet face with peripheral sidewalls, the peripheral sidewalls being attached to a flexible frame by an adhesive compound where the frame is formed into three or more sidewall sections, the sidewall sections having a substantially flat sidewall and at least one projecting filter retaining tab, which form a flange on a first face of the sidewall sections for containing the adhesive compound with at least in part a non-coextensive cross brace inserted between at least two pleat tips on at least one filter face, which cross brace spans between opposing sidewall sections, wherein the cross brace has an attachment surface to which can be attached a detachable element.

2. The framed pleated filter media of claim 1 wherein the cross brace has a body portion extending into at least one pleat such that it is at least in part non-coextensive with the filter material forming the pleat and the cross brace is attached to the opposing sidewall sections.

3. The framed pleated filter media of claim 2 wherein the cross brace body portion does not deform the pleat structure.

4. The framed pleated filter media of claim 3 wherein the cross brace body portion does not taper at the same angle as the pleat at some portion of the body portion.

5. The framed pleated filter media of claim 1 wherein the attachment surface is a male or female type attachment surface.

6. The framed pleated filter media of claim 2 wherein the cross brace body extends 30 to 100 percent of the pleat depth.

7. The framed pleated filter media of claim 2 wherein the cross brace body extends 50 to 90 percent of the pleat depth.

8. The framed pleated filter media of claim 1 wherein the cross brace has a lip portion on at least one side of the brace.

9. The framed pleated filter media of claim 8 wherein the lip portion engages with at least one pleat tip.

10. The framed pleated filter media of claim 9 wherein the lip portion is substantially continuous.

11. The framed pleated filter media of claim 2 wherein the cross brace is profile extruded.

12. The framed pleated filter media of claim 2 wherein the cross brace has a groove into which is insertable a removable key for engagement with the filter frame sidewall sections.

13. The framed pleated filter media of claim 12 wherein the groove extends into the cross brace body.

14. The framed pleated filter media of claim 13 wherein the groove also has additional elements insertable therein.

15. The framed pleated filter media of claim 2 wherein the flexible frame is a discrete strip frame.

16. The framed filter media of claim 15 further including at least one elastically deformable sealing lip on a second face of the sidewall sections.

17. The framed filter media of claim 15 wherein the sidewall sections are formed of a thermoplastic polymer.

18. The framed filter media of claim 17 wherein the cross brace is formed of a thermoplastic polymer.

19. The framed filter media of claim 18 wherein the filter frame and cross brace are formed at least in part by the same thermoplastic polymer.

20. The framed pleated filter media of claim 2 wherein the cross brace is formed of a flat preform.

21. The framed filter media of claim 20 wherein the cross brace is formed of a folded flat preform provided with a male or female attachment surface.

22. The framed filter media of claim 21 wherein the cross brace is formed of sheet metal.

23. The framed filter media of claim 21 wherein the cross brace is formed of chipboard.

24. A framed pleated filter media comprising a pleated filter media having a fluid inlet face and a fluid outlet face with peripheral sidewalls, the peripheral sidewalls being attached to a flexible frame by an adhesive compound where the frame is formed into three or more sidewall sections, the sidewall sections having a substantially flat sidewall and at least one projecting filter retaining tab which form a flange on a first face of the sidewall sections for containing the adhesive compound with at least in part a non-coextensive cross brace inserted between at least two pleat tips on at least one filter face which cross brace spans between opposing sidewall sections, wherein the cross brace is profile extruded.

25. The framed pleated filter media of claim 24 wherein the cross brace has a body portion extending into at least one pleat such that it is at least in part non-coextensive with the filter material forming the pleat and the cross brace is attached to the opposing sidewall sections.

26. The framed pleated filter media of claim 24 wherein the cross brace body portion does not deform the pleat structure.

27. The framed pleated filter media of claim 26 wherein the cross brace body portion does not taper at the same angle as the pleat at some portion of the body portion.

28. The framed pleated filter media of claim 24 wherein the cross brace has an attachment surface to which can be attached a detachable element.

29. The framed pleated filter media of claim 25 wherein the cross brace body extends 30 to 100 percent of the pleat depth.

30. The framed pleated filter media of claim 25 wherein the cross brace body extends 50 to 90 percent of the pleat depth.

31. The framed pleated filter media of claim 24 wherein the cross brace has a lip portion on at least one side of the brace.

32. The framed pleated filter media of claim 31 wherein the lip portion engages with at least one pleat tip.

33. The framed pleated filter media of claim 32 wherein the lip portion is substantially continuous.

34. The framed pleated filter media of claim 25 wherein the cross brace has a groove into which is insertable a removable key for engagement with the filter frame sidewall sections.

35. The framed pleated filter media of claim 34 wherein the groove extends into the cross brace body.

36. The framed pleated filter media of claim 35 wherein the groove also has additional elements insertable therein.

37. The framed pleated filter media of claim 25 wherein the flexible frame is a discrete strip frame.

38. The framed filter media of claim 37 further including at least one elastically deformable sealing lip on a second face of the sidewall sections.

39. The framed filter media of claim 37 wherein the sidewall sections are formed of a thermoplastic polymer.

40. The framed filter media of claim 39 wherein the cross brace is formed of a thermoplastic polymer.

41. The framed filter media of claim 40 wherein the filter frame and cross brace are formed at least in part by the same thermoplastic polymer.

42. The framed filter media of claim 25 wherein the cross brace is formed of a flat preform.

43. The framed filter media of claim 42 wherein the cross brace is formed of a folded flat preform provided with a male or female attachment surface.

44. The framed filter media of claim 43 wherein the cross brace is formed of sheet metal.

45. The framed filter media of claim 43 wherein the cross brace is formed of chipboard.

* * * * *

UNITED STATES PATENT AND TRADEMARK OFFICE
CERTIFICATE OF CORRECTION

| | | |
|---|---|---|
| PATENT NO. | : 7,258,717 B2 | Page 1 of 1 |
| APPLICATION NO. | : 10/878781 | |
| DATED | : August 21, 2007 | |
| INVENTOR(S) | : Dean R. Duffy | |

It is certified that error appears in the above-identified patent and that said Letters Patent is hereby corrected as shown below:

Column 2
Line 10, delete "Comer" and insert -- Corner -- in place thereof.

Signed and Sealed this

Twentieth Day of May, 2008

JON W. DUDAS
*Director of the United States Patent and Trademark Office*